UNITED STATES PATENT OFFICE.

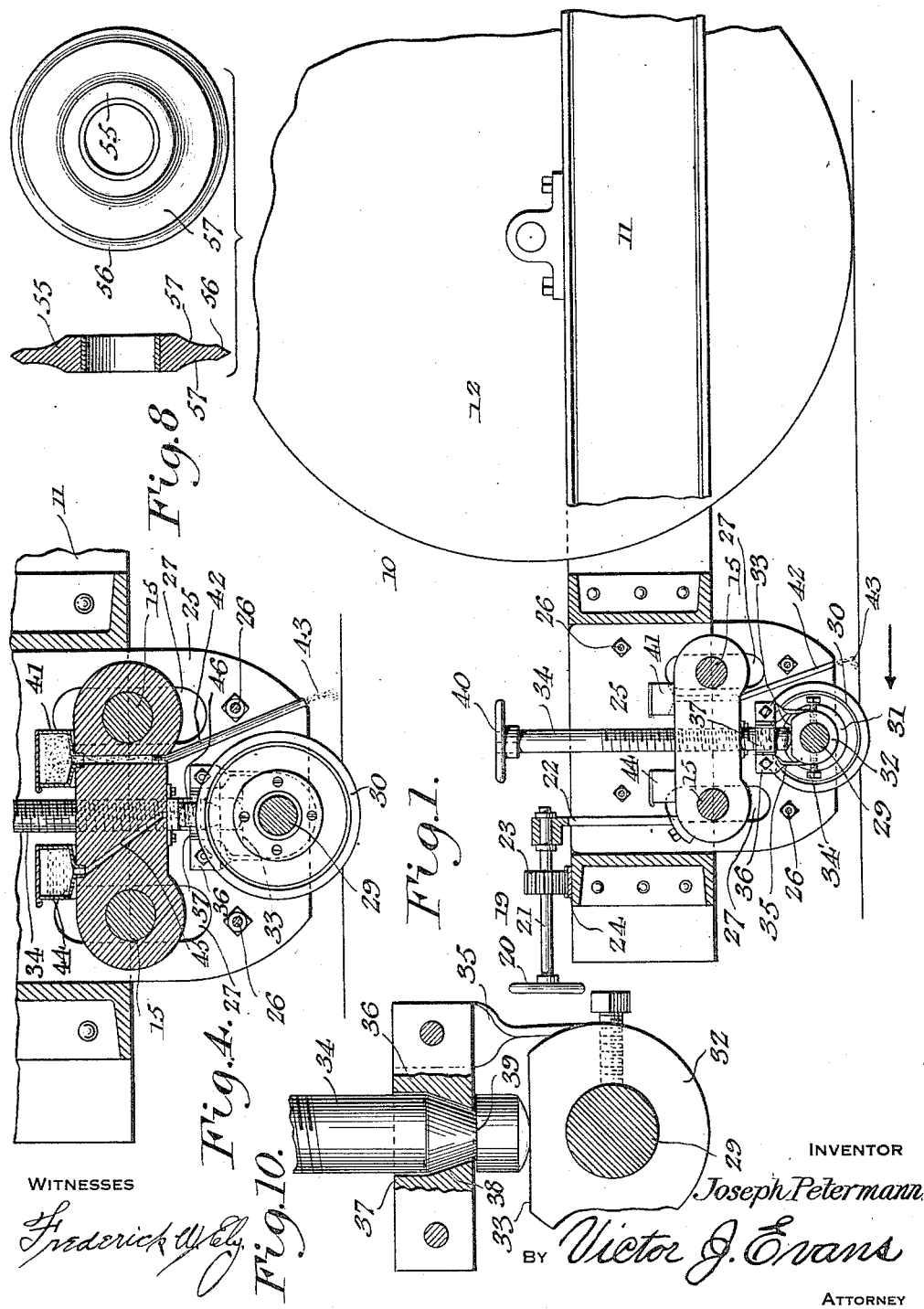

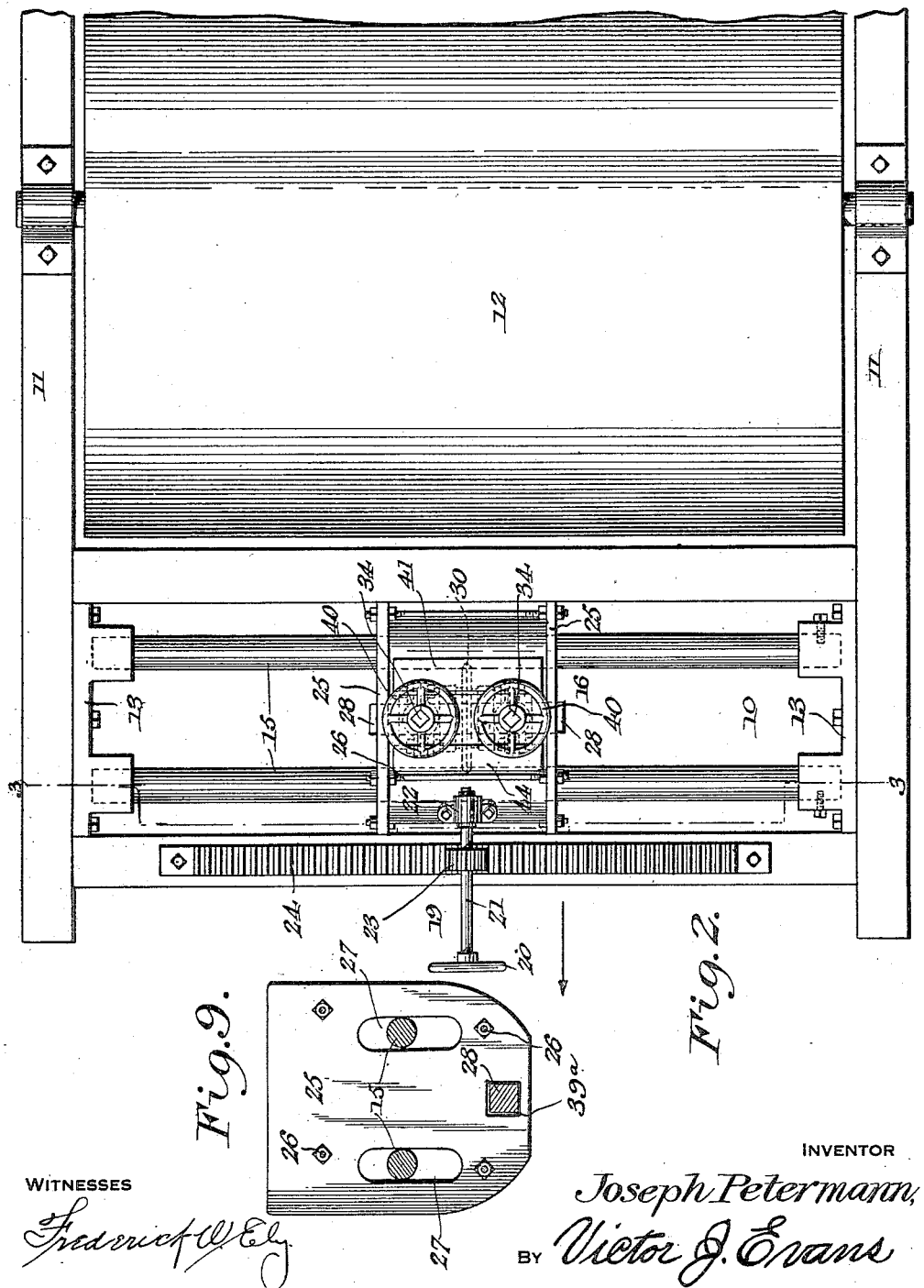

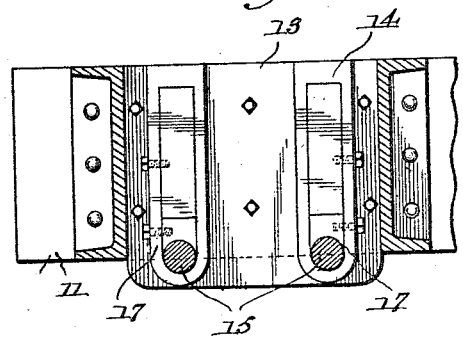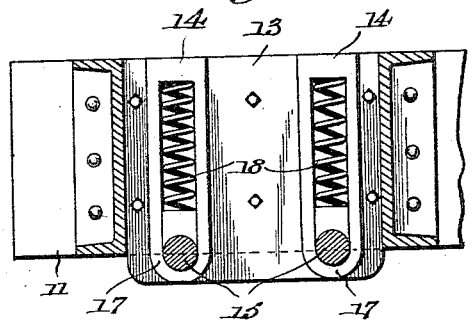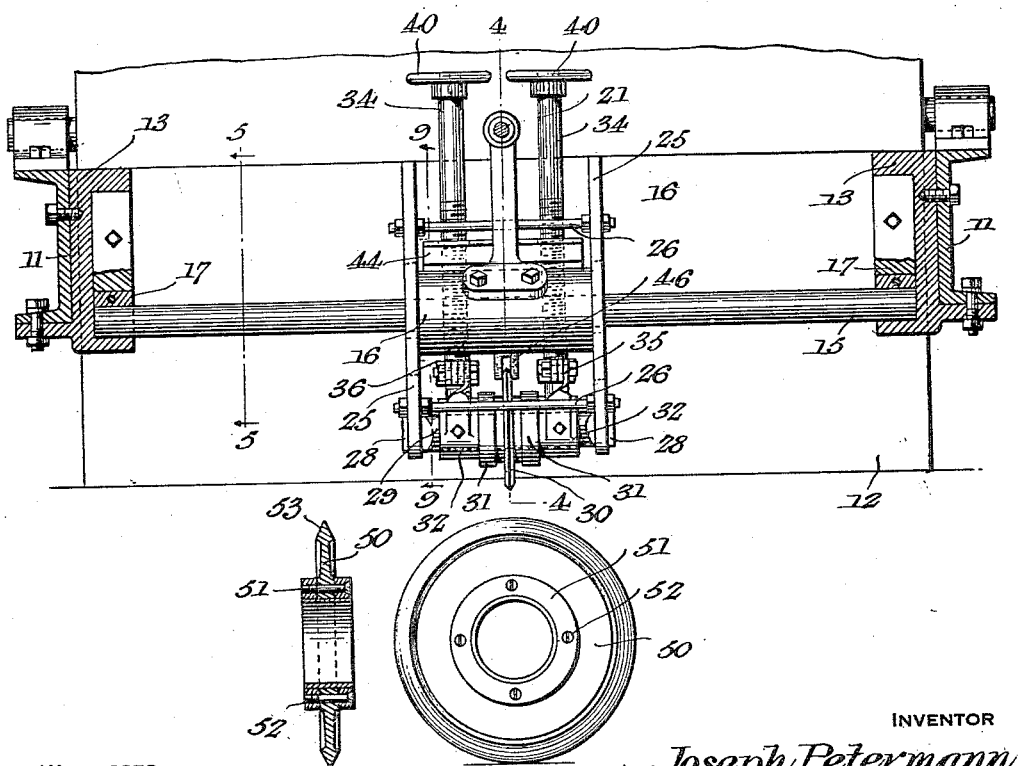

JOSEPH PETERMANN, OF PHILADELPHIA, PENNSYLVANIA.

APPARATUS FOR CUTTING AND BREAKING ASPHALT OR CONCRETE.

1,276,686.  Specification of Letters Patent.  Patented Aug. 20, 1918.

Application filed June 20, 1917. Serial No. 175,941.

*To all whom it may concern:*

Be it known that I, JOSEPH PETERMANN, a citizen of the United States, residing at 6149 Walnut street, Philadelphia, in the county of Philadelphia and State of Pennsylvania, have invented new and useful Improvements in Apparatus for Cutting and Breaking Asphalt or Concrete, of which the following is a specification.

The invention relates to apparatus for cutting and breaking stone work, cement, concrete or asphalt, and has for an object to provide an apparatus which may be as a unit or in the nature of an attachment to another apparatus, for the purpose of cutting, breaking or crushing asphalt or concrete, the apparatus being designed for use on highways and like places where it is desired to remove or break up an old portion of the street, and renew same.

It is well known that considerable difficulty is experienced in breaking up asphalt on a street, the usual method being to use a sledge hammer to crush or crack the asphalt, and then subsequently use a pick to remove the crushed or broken parts, and further tear the asphalt surface away from the under stone surface. This method is a very cumbersome one, takes considerable time, and is not productive of good results. I aim to employ a suitable cutting mechanism which can be controlled by the operator, and which is preferably used in connection with a steam roller or the like, so that the cutting element will cut into the asphalt, and the weight of the roller or other implement crush and break the asphalt. With this character of apparatus, the operation of cutting, crushing or breaking can be accomplished at one and the same time, and the use of an apparatus such as described herein, will greatly expedite the removal of the asphalt top surface of the highway.

In the further disclosure of the invention, reference is to be had to the accompanying drawings, constituting a part of this specification, in which similar characters of reference denote corresponding parts in all the views, and in which Figure 1 is a fragmentary side elevation of a steam or other roller, showing a part of my apparatus in side elevation and in section.

Fig. 2 is a fragmentary plan view of the structure shown in Fig. 1.

Fig. 3 is a vertical transverse sectional view taken substantially on the line 3—3 in Fig. 2.

Fig. 4 is a vertical sectional view taken on the line 4—4 in Fig. 3.

Fig. 5 is a vertical sectional view taken on the line 5—5 of Fig. 3.

Fig. 6 is a side elevation of the cutter, the same being also shown in transverse section.

Fig. 7 is a modified form of bearing support somewhat similar to the one disclosed in Fig. 5.

Fig. 8 is a side elevation of a modified form of cutter, the same being also shown in section.

Fig. 9 is a fragmentary section taken on the line 9—9 of Fig. 3, and

Fig. 10 is a fragmentary enlarged detail, showing the manner of raising or lowering the cutter.

Referring more particularly to the views, I disclose a part of a steam roller 10, consisting of the usual frame work 11 and roller 12. Attached to the frame work 11 is a supplemental frame 13 which carries on each side a bearing 14 for supporting horizontally disposed slide bars 15 over which a carriage 16 can be slid from one side to another as desired. The bars or bearings 15 supporting the carriage 16 can be suitably secured in the bearings 14 as shown at 17, or as shown in Fig. 7 springs 18 can be employed to take up for the unevenness of the roadway, thus giving the carriage a vertical freedom of movement relative to the roller itself, this construction being readily understood by reference to Figs. 5 and 7.

The carriage 16 is associated with an operating mechanism 19, consisting of a wheel 20 carried on a shaft 21, journaled on the carriage at 22, said shaft 21 carrying a pinion 23 operating over a rack 24 secured to the frame of the steam roller. It will thus be seen that by rotating the wheel 20 the carriage can be moved from one side to another over the bearing bars or supports 15.

The carriage 16 consists of side plates 25 secured by suitable cross braces 26, and as mentioned before, is slidingly arranged upon the bars 15, said side plates 25 have slots 27 therein, arranged vertically in the side plates for the slide bars 15, and having the squared ends 28 of a horizontally disposed shaft 29 resting therein, said shaft 29 constituting a cutter shaft, and carrying loosely a cutter 30. On each side of the cutter 30 suitable rollers 31 are provided, so that if the cutter should cut too deep, the rollers will not allow the carriage to rest directly on the highway, but the rollers themselves will operate over the surface of the highway. On each side of the rollers 31 are collars 32, which on account of their eccentric shape do not extend down as far as the rollers, which will be seen by referring to Fig. 1, said collars 32 having flat upper surfaces 33, against which the lower ends of vertically disposed screws 34 abut, the collars 32 encircling the cutter shaft 29 and held by suitable screws 34. On each side of the cutter and for each collar 32, there is provided a stirrup 35, having the ends connected with a suitable yoke 36 encircling the lower end of the screw, with portions of the yoke in the nature of a collar 37, and with bottom face 38 resting upon a base 39, formed by cutting in the screw adjacent its lower end, as clearly shown, thus insuring a raising of the lower part of the carriage, or more particularly the cutter, its shaft and component parts, it being understood that each screw 34 is threaded through the carriage 16, as shown in Fig. 1, with each screw furthermore carrying a suitable operating wheel 40.

Referring to Fig. 2, it will be seen that there is provided a receptacle 41, which by means of a suitable pipe 42 is adapted to convey by gravity a quantity of sand 43 to a point immediately behind the cutter, and there is also provided a receptacle 44 containing oil, which through the medium of a conduit 45 supplies a quantity of oil to a U-shaped felt washer or wick 46, adapted to straddle the cutting edge of the cutter so as to keep the same lubricated at all times.

Now it will be seen that when the cutter has been forced downwardly into the asphalt by rotating the operating wheels 40, moving the screws 34 downwardly and the steam roller is advanced over the surface, the weight of the steam roller will hold the cutter down into the asphalt, and give it the necessary pressure and cutting strength to stay in the asphalt and cut through the same as the roller is moved in the direction of the arrow, thus cutting a groove of considerable size into the asphalt, whereby when the large roller 12 coming immediately after the cutting action and operating over the same ground will crush or break the cut asphalt, so that its subsequent removal can be more readily accomplished. The depth of the cutter in the asphalt can be of course regulated by operating the wheels 40 of the screws 34, and the particular location of the cutter upon the steam roller frame can be controlled through the medium of the rack and pinion mechanism used when the wheel 20 is operated. It is well known that in warm weather asphalt becomes very sticky and soft, due to the pitch, tar, oil, or other similar ingredients that may be contained therein, and it is for this reason that a supply of sand is run into the groove made by the cutter, so that if the workmen engaged in removing the cut asphalt could not reach the point where the cut has been made immediately thereafter, the sand will prevent the asphalt from coming together again, due to its tendency to absorb the oily substance, and thus prevent binding of the two parts of the asphalt that have been separated due to the cutting action of the cutter.

The cutter shown in Fig. 6 consists of a cutter body 50 with collars 51 on each side all secured together by suitable screws 52, and the said cutter body 50 has a diamond shaped edge 53. The cutter shown in Fig. 8, however, is of a substantially unitary construction, and the cutter body is indicated by the numeral 55, said cutter body being formed with a diamond-like edge 56 of a circumferential nature and having curved sides 57, which are very important to the true and proper operation of the cutter, in that a better cut is secured as there is less liability of the cutting edge becoming worn or unfit for further use, whereas the curved faces adjacent the cutting edge, and which as mentioned before are indicated by the numeral 57, permit the cutting edge to extend deeper into the asphalt.

From the foregoing it will be seen that with an apparatus of the character described, whether to be used as a unit, with a steam roller, tractor, or other mechanism, relies upon the weight of the frame work of the vehicle or machine, to push the cutter into the asphalt, or give it the necessary pressure to dig into the asphalt, the cutter being then advanced by suitable machinery provided to advance the vehicle over the ground, and it will be clearly apparent that with the simple construction disclosed, the depth of the cutter can be regulated at all times, and particularly in a case where the cutter is used on a steam roller, the tremendous weight of the roller aids in giving the desired pressure to insure the cutting of the asphalt, and the roller body itself further aids in breaking up the cut asphalt.

It will be seen by the drawings that the device is of simple construction, and consists of few parts that cannot readily get out of order, and although I have shown my invention as applied to a steam roller, it will be understood that it can be used with various forms of vehicles or machinery, adapted to be operated over the surface of a highway, and that the apparatus can also be used for cutting stone, cement, and what are known as "Tarvia" roads. Further, it will be apparent that I do not limit myself to the particular construction set forth, that various slight changes can be made from the disclosure without departing from the spirit of the invention, and that the scope thereof is defined in the appended claim.

Having described my invention, what I claim as new is:

An apparatus for cutting into the surface of a highway or the like, comprising a weighted frame adapted to be operated over the highway, a carriage movably supported on said frame, a cutter on said carriage, and by the weight of the frame adapted to cut into the surface of the highway, means for controlling the depth of cut of the cutter, means for moving the cutter carriage on the frame, means for lubricating said cutter, and means for depositing a quantity of sand or absorbent material in the path of the cutter, or in the groove made in the highway by the cutter.

In testimony whereof I affix my signature.

JOSEPH PETERMANN.

Copies of this patent may be obtained for five cents each, by addressing the "Commissioner of Patents, Washington, D. C."